(12) United States Patent
Motamed et al.

(10) Patent No.: US 9,158,479 B2
(45) Date of Patent: Oct. 13, 2015

(54) AUTOMATED PRINTER'S DASHBOARD

(75) Inventors: Margaret Motamed, Foster City, CA (US); Haresh Joshi, Foster City, CA (US); Antony Joseph Peter, San Mateo, CA (US); Toby Weiss, San Francisco, CA (US)

(73) Assignee: Electronics for Imaging, Inc., Fremont, CA (US)

( * ) Notice: Subject to any disclaimer, the term of this patent is extended or adjusted under 35 U.S.C. 154(b) by 51 days.

(21) Appl. No.: 13/876,457

(22) PCT Filed: Sep. 30, 2011

(86) PCT No.: PCT/US2011/054327
§ 371 (c)(1),
(2), (4) Date: Dec. 31, 2013

(87) PCT Pub. No.: WO2012/044994
PCT Pub. Date: Apr. 5, 2012

(65) Prior Publication Data
US 2014/0118775 A1    May 1, 2014

Related U.S. Application Data

(60) Provisional application No. 61/388,905, filed on Oct. 1, 2010.

(51) Int. Cl.
*G06F 15/00*      (2006.01)
*G06F 3/12*       (2006.01)
(Continued)

(52) U.S. Cl.
CPC ............ *G06F 3/1203* (2013.01); *G06F 3/1229* (2013.01); *G06Q 10/063* (2013.01); *G06Q 10/20* (2013.01); *H04N 1/00042* (2013.01)

(58) Field of Classification Search
CPC ... G06F 3/1203; G06F 3/1229; G06Q 10/063; G06Q 10/20; H04N 1/00042
USPC ................................ 358/1.1, 1.14, 1.15, 1.13
See application file for complete search history.

(56) References Cited

U.S. PATENT DOCUMENTS 6,681,349 B2    1/2004    Sekizawa
7,265,819 B2    9/2007    Raney
(Continued)

OTHER PUBLICATIONS

"HP Web Jetadmin", Wikipedia Internet Article. XP055164163, Retrieved from the Internet: URL:http://en.wikipedia.org/w/index.php?title=HP Web Jetadmin&oldid=382083777; [retrieved-on Jan. 22, 2015] Aug. 31, 2010, 1 page.
(Continued)

*Primary Examiner* — Douglas Tran
(74) *Attorney, Agent, or Firm* — Michael A. Glenn; Perkins Coie LLP (57) ABSTRACT

Techniques are provided for generating and using automated production and performance dashboards. For example, an automated production dashboard is generated and used that includes, but is not limited to, defining production performance metrics, job stats, trends, red/green/yellow with health check, and risks. As well, an automated upkeep dashboard is generated and used that includes, but is not limited to, defining supplies, maintenance, trends, next service appointments, red/green/yellow with health check, and risks. Such techniques may include a remote view of such dashboards, e.g. via native mobile applications in addition to web/client, etc.

21 Claims, 8 Drawing Sheets

(51) Int. Cl.
*G06K 1/00* (2006.01)
*G06Q 10/06* (2012.01)
*G06Q 10/00* (2012.01)
*H04N 1/00* (2006.01)

(56) References Cited

U.S. PATENT DOCUMENTS

| | | |
|---|---|---|
| 7,528,981 B2 | 5/2009 | Johnson et al. |
| 2004/0125403 A1 | 7/2004 | Furst et al. |
| 2006/0092452 A1 | 5/2006 | Simpson |
| 2008/0004748 A1 | 1/2008 | Butler et al. |
| 2010/0085597 A1 | 4/2010 | Vulugundam |
| 2013/0286426 A1* | 10/2013 | Morovic et al. ............. 358/1.14 |
| 2014/0085665 A1* | 3/2014 | Sheldon et al. ............. 358/1.15 |

OTHER PUBLICATIONS

Tanenbaum, Andrew S. et al., "Distributed Systems: Principles and Paradigms" In: Distributed Systems: Principles and Paradigms (2nd Edition), Pearson Prentice Hall, New Jersey, USA; XP055164378, ISBN: 978-0-13-239227-3; Oct. 12, 2006, pp. 1-68.

Valetto, Giuseppe et al., "A Mobile Agent Approach to Process-Based Dynamic Adaptation of Complex Software Systems" In: Lecture Notes in Computer Science, vol. 2077; Springer Berlin Heidelberg; XP055164229, ISSN: 0302-9743 ISBN: 978-3-54-045234-8; Jan. 1, 2001, pp. 102-116.

\* cited by examiner

| Home | Printers | Jobs & Consumables | Settings | Export ▾ | Print |

Printers
07/28/2010 - 08/03/2010

Engine Performance
- Engine 1

XEROX
  Docucolor 7000AP/8000AP
  - 192.168.154.111
  - 128MB free of 1024MB total
  - 230GB free of 1.5 TB total Avg System Uptime
  92%
  Avg Engine Utilization
  45%

Performance

Last Checked Today, 12:32pm

- Engine 2

XEROX
  Docucolor 7000AP/8000AP
  - 192.168.154.112
  - 348MB free of 1024MB total
  - 640GB free of 1.5 TB total Avg System Uptime
  12%
  Avg Engine Utilization
  14%

Performance

Last Checked Today, 12:32pm

System Uptime
Engine 1 ✓ ✓ ✓ ✓ ✓ ✓ ✓
Engine 2 ✓ ✓ ✓ ✓ ⚠ ⚠ ⚠
7/28/2010 7/29/2010 7/30/2010 7/31/2010 8/1/2010 8/2/2010 8/3/2010

Engine Utilization
→ Engine 1
→ Engine 2
100%
66%
33%
0%
7/28/2010 7/29/2010 7/30/2010 7/31/2010 8/1/2010 8/2/2010 8/3/2010

Engine Humidity & Temp
→ Engine 1
→ Engine 2
80°F
70°F
60°F
50°F
7/28/2010 7/29/2010 7/30/2010 7/31/2010 8/1/2010 8/2/2010 8/3/2010

Report Settings
Timeframe
[ Period ▾ ]
From:
◀◀ ◀ July ▶▶ ▶
Su Mo Tu We Th Fr Sa
27 28 29 30 1 2 3
4 5 6 7 8 9 10
11 12 13 14 15 16 17
18 19 20 21 22 23 24
25 26 27 [28] 29 30 31
1 2 3 [4] 5 6 7

To:
◀◀ ◀ August ▶▶ ▶
Su Mo Tu We Th Fr Sa
25 26 27 28 29 30 31
1 2 3 [4] 5 6 7
8 9 10 11 12 13 14
15 16 17 18 19 20 21
22 23 24 25 26 27 28
29 30 31 1 2 3 4

Include:
☑ Engine 1
☑ Engine 2
☐ Engine 3
☐ Engine 4

Select All | Deselect All

[ SUBMIT ]

Help

How to add engine?
Another useless help bullet?

AUTOMATED PRINTER'S DASHBOARD

CROSS REFERENCE TO RELATED APPLICATIONS

This patent application is a U.S. National Phase of PCT/US2011/054327 filed 30 Sep. 2011, and also claims the benefit of U.S. provisional patent application Ser. No. 61/388,905, AUTOMATED PRINTER'S DASHBOARD, filed Oct. 1, 2010, the entirety of each is incorporated herein by this reference thereto.

BACKGROUND OF THE INVENTION

1. Technical Field

This invention relates generally to the field of automated online dashboards. More specifically, this invention relates to generating and using automated dashboards for the management of a large group of devices.

2. Description of the Related Art

Technology has advanced so rapidly and by such vast leaps and bounds that ownership of many devices, including but not limited to, very large printing devices, is becoming more and more common for enterprises, government organizations, and other similar types of organizations. Thus, as such organizations acquire larger and larger number of such devices, current techniques for the management of such plethora of devices is either void or seriously lacking.

A system and method for remote monitoring of a print system is discussed in N. Johnson, D. Schroeder, P. Sylvester, P. Donigain, J. Dreyer, M. Condon, and J. M. Lafleur, U.S. Pat. No. 7,528,981, System and method for remote monitoring of print systems (May 5, 2009). Johnson et al teach techniques that are focused on the diagnosis of the error.

A system and method for print system monitoring is discussed in A. L. Raney, U.S. Pat. No. 7,265,819, System and method for print system monitoring (Sep. 4, 2007). Raney teaches techniques that are focused on the whole for purposes of rectifying and avoiding printing problems.

However, such prior art techniques are limited and fail to address the automated management of entire fleets of devices.

SUMMARY OF THE INVENTION

Techniques are provided for generating and using automated production and performance dashboards. For example, an automated production dashboard is generated and used that includes, but is not limited to, defining production performance metrics, job stats, trends, red/green/yellow with health check, and risks. As well, an automated upkeep dashboard is generated and used that includes, but is not limited to, defining supplies, maintenance, trends, next service appointments, red/green/yellow with health check, and risks. Such techniques may include a remote view of such dashboards, e.g. via native mobile applications in addition to web/client, etc.

DETAILED DESCRIPTION OF THE INVENTION

Overview

Techniques are provided for generating and using automated production and performance dashboards. For example, an automated production dashboard is generated and used that includes, but is not limited to, defining production performance metrics, job stats, trends, red/green/yellow with health check, and risks. As well, an automated upkeep dashboard is generated and used that includes, but is not limited to, defining supplies, maintenance, trends, next service appointments, red/green/yellow with health check, and risks. Such techniques may include a remote view of such dashboards, e.g. via native mobile applications in addition to web/client, etc.

Thus, embodiments are provided herein for managers, e.g. business owners, of multiple devices, e.g. printers, medical devices (body and tissue scanners, for example), aeronautic devices (airplanes, military helicopters and so on), within a production or maintenance facility. Such embodiments provide an automated mechanism to aid in the understanding of aggregated statistics of the corresponding devices, e.g. printers, and productive tasks, such as printing print jobs, of the production or maintenance facility. Via such automated mechanism, a manager may make decisions, such as business decisions, about, but not limited to, sales strategy, servicing, leasing strategy, paper/media/ink strategy, usage designation, scheduling and reliability, real costs (e.g. down time is a cost as well), equipment buying decisions, sales prediction or forecast, and so forth.

Overview of Embodiments in Printing Technology

In one embodiment, a system is provided that aggregates data from the printers owned by an organization, such as but not limited to, a business, for the purpose of providing relevant information, such as but not limited to, from dashboards, e.g. business dashboards, health checks, and automated reminders. When data is aggregated at a server that is shared between multiple companies, e.g. in the cloud or by some other networked configuration, e.g. the Intranet, then trends and comparisons against benchmark data are also computed and presented.

In one embodiment, an automatic dashboard is generated and used by a production operator or anyone other individual who is trying to take a business view of multiple printers. Such individual may want to have both a health check and a business check of his or her printers. In accordance with the embodiment, the individual may schedule maintenance, view trends, and detect problems with one or more printers. As well, the individual may discern usage or utilization of such printers across an entire print shop. Groups of printers may be set up, such that the individual may focus on and just see the activities and states of one or more groups of printers. For example, both a health check and a business check may be performed on a group of printers. By such checks, an enterprise may learn, for example, about the efficiency of the printers, the number of times the enterprise has had to call for repairs, the number of errors, and so on. Each call, interruption, or failure has hidden costs to the business that are not typically understood or monitored today.

It should be appreciated that embodiments herein provide an important business application for people or businesses who own or operate a lot of printers, as these printers are expensive devices and their upkeep may be challenging and difficult at times. It may be a huge task to learn about and understand the statuses and activities of an entire fleet of devices or printers. Thus, an embodiment provides an automated dashboard tool that provides, among other things, the business owner or the individual who is responsible for production on a larger number or a fleet of printers a business view.

In one embodiment, a dashboard is provided that is targeted for the business print shop owners, managers, who, may have anywhere from a small print shop with the 5 to 10 print engines up to big enterprises where they may have a thousand or so printer controllers driving the digital printers. Such embodiment provides such owners or managers an automated overview of their printers.

For example, with such embodiment, the owners or managers can see or detect the entire system uptime as a whole fleet of their devices. They can see or ascertain usage; for instance, they can determine whether printers or the fleet are being used in the way they anticipated. They can easily generate reports reflecting usage data for the entire fleet, individual devices or for a subset aggregated devices based upon certain features including but not limited to color versus black and white, certain finishing capabilities, location or any other owner or manager designated criteria. Analyses may be computed from such reports or data. Thus, embodiments provide business intelligence from automated integration of the individual printers or systems.

An examples report may include, but is not limited to, the uptime utilization health of a print engine and a fleet of controllers or some subset or combination of print engines and/or controllers. Another example may include, but is not limited to, presenting the kind of print jobs and workflows that are running on one or more printers. As well, such data may be rolled up and summarized in an automated fashion and displayed or otherwise provided. Further examples are described in detail hereinbelow.

In one embodiment, reports may be customized or individuals may create their own views for the entire fleet, individual devices or for a subset aggregated devices based upon certain features including but not limited to color versus black and white, certain finishing capabilities, location or any other owner or manager designated criteria in accordance with their own business needs.

In one embodiment, the dashboard and views are available on any device, anywhere, for instance by usage of cloud technology. The embodiment provides various facets to the user interface such that an "any device, anywhere" dashboard specifically targeted for the print engines and print controllers is provided. It should be appreciated that the variety of user interfaces are provided by incorporating device-independent or device-particular formats such that aspects of the dashboard are available on, but not limited to, mobile devices, smartphones, PCs, iPhones, tablets, and so forth.

It should be appreciated that embodiments herein provide, but are not limited to, one or more the following features:

Understand print engine uptime/downtime;
See peaks and valleys in production;
Access to data from where an individual works (Work PC, home office, mobile device);
Export data for use in other applications, e.g. by Quick Books, Excel, etc.;
Ability to integrate with or pass data to third party tools including, but not limited to, cost tracking/accounting, and Print MIS systems;
Data to help with staffing and scheduling;
Architecture to support expanded feature set, communication to enterprise and Print MIS systems;
Media, Toner, Toner coverage—Consumed;
Color, BW, Total Click Counts;
Job analysis—file type, submission path, user/department;
Total cost of ownership and other cost data—Media, toner, click charges, lease rate;
Customizable Dashboard;
Third party tracking tool integration, e.g. middleware, cost accounting, Print MIS, web services;
Widget to show picture and status of machines;
Keep history without having to remember to export it before it expires;
Aggregate data into one screen;
Benchmarking tools utilizing data from the fleet, subsets or other aggregated data derived from other end users and devices;
Forecast and prediction from previously collected data; and
Strategic grouping of printer controllers, e.g. by geographic location, by types, etc.

Cloud-Based Solution

In one embodiment, a cloud-based solution is provided. Such solution is powerful. For example, when looking at high volume prints in the print industry, a cloud-based solution using cloud-based technology provides data aggregation for the high-end production devices. It should be appreciated that while a cloud-based solution may be provided, enterprise or local solutions may be useful, as well. Thus, with cloud-based technology and in accordance with embodiments herein, the power of fleet management is made available to end-users for the purposes of, among other things, dissecting and analyzing the data in a fashion or configuration in which they care or that matters to them and their business. For example, an enterprise may set up multiple shops, where the dashboard views related to each shop is customized according to that shop.

Thus, in a cloud-based embodiment, end-users can visit a corresponding URL or application, e.g. as in mobile application software, and from that site or application are able to monitor, but are not limited to: their entire fleet of printers, printers at a particular branch or two, and even one single printer at the same time.

In one embodiment, the cloud-based configuration provides web services. For example, updates and fixes can be dispersed to multiple end-users over the Internet or indirectly as the cloud-based components are updated or fixed.

Thus, in accordance with embodiments herein, such features of the automated dashboard are provided for mobile devices, tablets, and the like.

For example, business owners or flow managers are able to take advantage of the automated dashboard and other features. Such individuals may receive mobile alerts as events happen. That is, in an embodiment, end-users receive real-time data feeds from an entire enterprise, an individual shop, a single printer, and so on.

It should be appreciated that while an embodiment provides a cloud-based solution, the embodiment is not limited in also using standard APIs. For instance, a standard API may be provided that may be used to leverage data from third parties. For example, by using such API(s), an enterprise may consume data from a third party or vice-versa on an agreement, e.g. to consume particular data and present such in the way they like. For example, an end-user who is managing a fleet of high-end printers may be interested in viewing stock prices of a small company that provides a particular part on which their printer relies.

Benchmarking

An embodiment provides for comparing anonymously one shop, e.g. print shop, to another shop, e.g. another print shop, or one facility or group of devices, e.g. group of printers to another facility or another group of devices, e.g. group of printers. The embodiment allows logging relevant metric data and business data and using such logged data for benchmarking in real-time or on the fly as part of the automated dashboard. By such embodiment, an operator may compare his or her group of printers to, but not limited to, within the same company, to a similar print shop, to a different print shop, to an in-house print facility, or to a group of franchised printer locations, or to benchmark data provided by the application or service provider based upon studies or all or some portion of data generated by the customers of this application or service and their connected devices. It should be appreciated that the benchmarking enabled by the gathering of metrics in accordance with an embodiment is powerful.

Overview of Configuration

An embodiment provides an overview of a configuration for a particular print shop. For example, in a print shop of 10 to 15 print engines, the automated dashboard is configured for rolling up or aggregating data, performing analysis, and presenting the results, such as in reports. In an embodiment, from the same dashboard, an overview of the configuration of printers is presented. For example, data reflecting which systems are running at which level of the hardware and the software are presented in a variety of views, including, but not limited to, graphical views. In addition or subsequently, corresponding comparisons are presented. For example, such corresponding comparisons may be presented with recommendations. For example, one presentation may show the particular print shop and how its fleet is performing based on a similarly configured fleet elsewhere. For instance, such presentation may show its fleet, in aggregate, is performing at two-thirds of the performance of the similarly configured fleet elsewhere.

An Implementation

Rolling Out Updates

One embodiment provides a configuration for rolling out updates, upgrades or patches to a fleet of devices. For example, an alert or other notification may be broadcast or pushed to the automated dashboard indicating that a network software or hardware component is available. In an embodiment, the notification may be pushed first to a pilot system or device. From there, it may get pushed to a group of beta systems. Then, such notification may ultimately get rolled over or pushed to an entire fleet. The customer may designate if, how and when such updates, upgrades or patches get pushed to devices. For example, it may be critical for the customers to only make system changes at non-peak or non-operational hours to maintain productivity and not impact print jobs. It should be appreciated that such mechanism may be very important for customers, such as for example, those that have a fleet of thousands of devices, have devices that are geographically dispersed, or are of different models and/or have different features and functionality. Thus, the embodiment ensures that, for example, when a new feature, functionality, or ability, fix or the like, becomes available, customers can determine when the devices will receive such without disruption to their operations or business.

In an embodiment, an automated dashboard is configured to roll out changes in phases and in an automated, rule-based, fashion. Such embodiment allows end-users to add business rules into the system. For example, such business rules may indicate shop hours, which systems are pilot systems, which systems are production systems, and the like. Thus, an embodiment enables allowing adding rules into the system and, from that point forward, automating the rollout.

Maintenance Mode

It should be appreciated that an automated dashboard in accordance with an embodiment indicates an overall status of the fleet of devices. Thus, in addition to the automated dashboard providing data, alerts, and notifications, the automated dashboard may be considered a cultural center. By such automated dashboard, facility manager, e.g. a shop manager or a shop owner, may receive updates and take subsequent action. An example of such subsequent action may include, but is not limited to, decisions to deploy the updates on selected printer controllers or a group. It should be appreciated that such decision and deployment may be made automatically by corresponding algorithms and the like or by such facility manager, shop manager or shop owner and the like.

Gives Power to End-Users

An embodiment may be understood by way of example. Thus, when a particular engine needs maintenance, such automated dashboard platform leverages that information and initiates a maintenance mode. Such maintenance mode may be related to the device, i.e. the particular engine, or related to program instructions that inform the device. For instance, the automated dashboard is configured to send updates or patches. In an embodiment, power is given to end-users to manage maintenance by way of a workflow and rules-based applications. In addition, such end-users may test updates or patches and the like, ensure that such changes are good in a particular environment, such as a closed environment, and subsequently push the changes out to a bigger fleet as and when needed. Thus, in accordance with embodiments herein, preventative maintenance mode can also be calendared and/or scheduled, e.g. by the shop manager or owner. Preventative maintenance can be shifted to meet the timing and needs of the business overall. For example, preventive maintenance can meet the timing and needs of a business by using the statistics and trends generated by and/or presented via the automated dashboard. For instance, patterns of failure can be shown by particular indicators such as, but not limited to, red/yellow/green colors. Such colors may indicate, but are not limited to, risk, reliability, and projected availability levels.

High Level System Architecture

Figure 1:
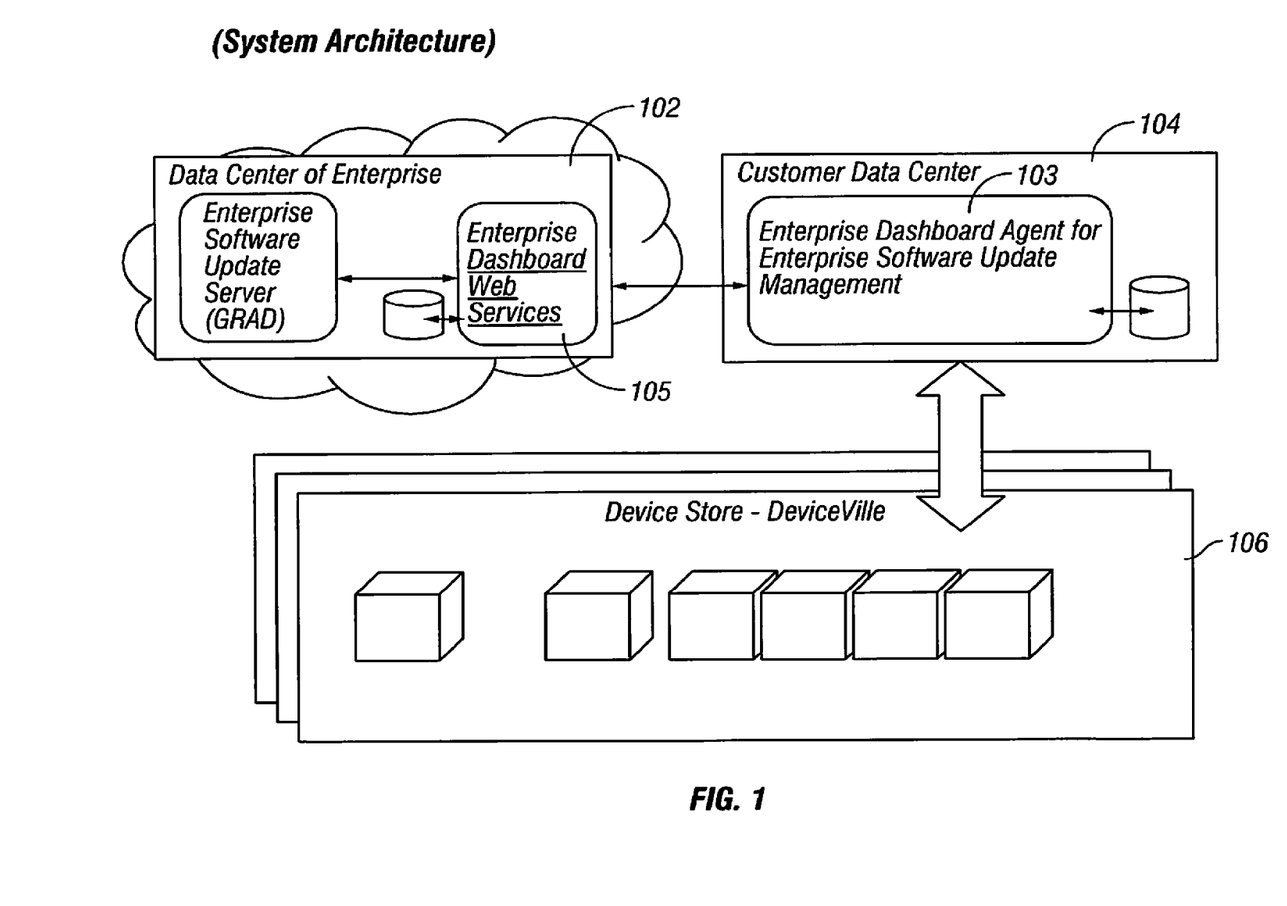
FIG. 1 is a schematic diagram of a high level view of an enterprise's data center, a customer data center, and a fleet of devices owned or managed by the customer, according to an embodiment.

A high level system architecture in accordance with one embodiment can be understood with reference to FIG. 1. FIG. 1 is a schematic diagram of a high level view of an enterprise's data center, a customer data center, and a fleet of devices owned or managed by the customer. Such system architecture provides a data center of an enterprise 102, which hosts an automated dashboard in a cloud and makes the automated dashboard available to users on any device anywhere. Such system architecture provides a dashboard agent 103 for enterprise update management at a customer data center 104. Customer data center 104 is in communication with one or more devices 106 owned by or managed by the customer. In the embodiment, customer data center 104 downloads dashboard agent 103, which runs inside the shop, e.g. print shop. Dashboard agent 103 collects relevant informational data from devices 106 performs other operations, including, but not limited to, keeping track of how the systems on each of devices 106 are running. In addition, dashboard agent 103 provides raw data, e.g. uploads or pushes raw data, to dashboard web services 105, which is used for analytics, business intelligence, report generation, and for generating and rendering the dashboards. For example, the customer could be a print shop with five to ten print controllers or devices.

Automated Printer's Dashboard

Figure 2:
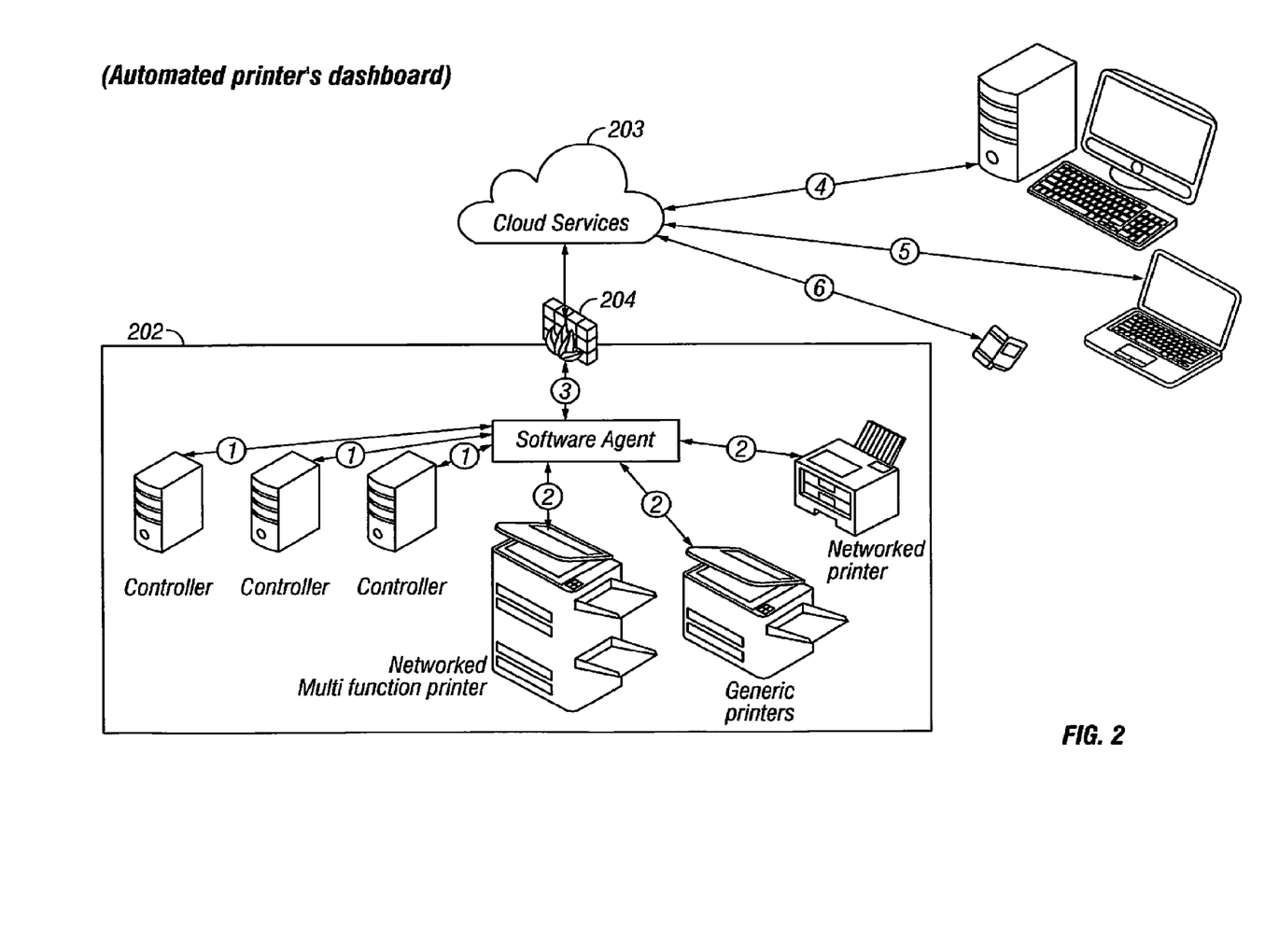
FIG. 2 is a schematic diagram of a high level configuration of production devices, networked services, and viewing devices, according to an embodiment.

One configuration of an automated printer's dashboard can be understood with reference to FIG. 2, where FIG. 2 is a schematic diagram of a high level configuration of production devices, networked services, and viewing devices, according to an embodiment. A customer's printing environment 202 contains, but is not limited to, printer controllers 1 and other printers 2, such as, but not limited to, multifunction printers (MFP) such as, but not limited to, scanners, generic printers, and networked printers.

In the embodiment, controllers 1 communicate with a software agent 3 in a secured way, e.g. through a firewall 204, with the data related to, but not limited to, uptime and current status. In accordance with the embodiment, software agent 3 is configured collect data from controllers 1 and printers 2. In addition, software agent 3 is further configured to communicate with cloud services 203 in both directions, as well as to collect and deploy data and services.

In the embodiment, software agent 3 uses, but is not limited to using, standard modes of communication with the generic networked printers and MFPs 2 for collection of data. It should be appreciated that pushing data, e.g. updates and patches, back to such devices 2 may be limited to the standards that are supported by devices 2.

One example of controllers 1 is Fiery® Digital Print Servers, by Electronics For Imaging, Inc.

In the embodiment, cloud services 203 are secured and may require end-users to log-in and be authenticated. At cloud services 203, end-users are presented with, but are not limited to, a full overview of environment 202, such as their shop. For example, end-users may be presented with, but not limited to, uptime of controllers 1 and devices 2, usage of controllers 1 and devices 2, states of controllers 1 and devices 2, and other relevant informational data.

Further, the embodiment provides communication with third party entities, such as but not limited to, other controllers 4. It should be appreciated that cloud services 203 is configured to provide mobile services to end-users on mobile devices 6 and other third party vendors 5. In one embodiment, APIs or web services are available from cloud services 203 that enable native web and mobile applications to consume data originally from the fleet of devices 202 and be allowed to build applications on top of such data.

In the embodiment, from an administration perspective, cloud services 203 are configured to contact a software update server (not shown) and the like and external third party clouds. Such configuration of cloud services 203 allows monitoring and pushing data via cloud technology through software agent 3 to the controllers 1 and printers 2.

Thus, the embodiment provides collecting data as well as pushing updates and fixes for printers or software when needed or as directed by the end user.

Further, an embodiment is configured to collect data directly from the device, e.g. the printer engine, depending on the networking protocol of such device. In the embodiment, the device is connected to the Internet and is configured to connect to the cloud without the need for the agent.

An Infrastructure and Service Example Embodiment

Figure 3:
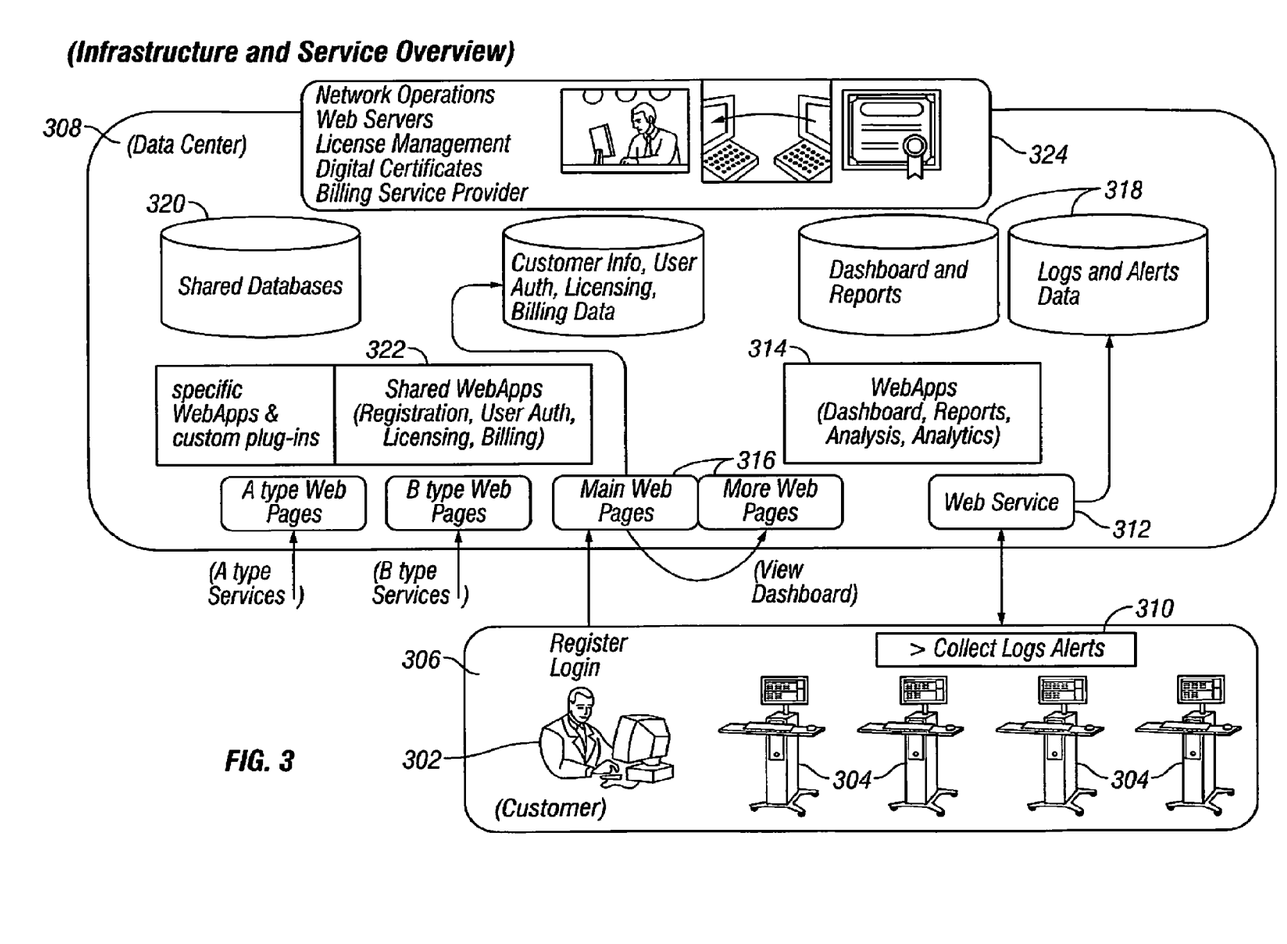
FIG. 3 is a schematic diagram of an infrastructure and service configuration, according to an embodiment.

One embodiment of infrastructure and service can be understood with reference to FIG. 3, a schematic diagram of an infrastructure and service configuration, according to an embodiment. It should be appreciated that the particular details are meant by way of example only and are not meant to be limiting.

In this example embodiment, a customer 302 has a number of printing devices 304. Such printing devices 304 may be, but are not limited to, controllers that connect to print engines, embedded controllers, and the like. It should be appreciated that FIG. 3 displays standalone RIP controllers connected to engines, however, such display just one possible instantiation and is not meant to be limiting.

In the example embodiment, at the customer site 306, customer 302 has many individual printers that supply logs, alerts, data, and other information, that may be queried from or pushed by those individual printers of printing devices 304 at customer site 306.

In the example embodiment, customer 302 registers or logs into a web server located in a data center 308 in the cloud somewhere. Subsequent to customer 302 registering with data center 308, an agent 310 is downloaded onto each printer of printing devices 304. In another embodiment, agent 310 is already present and configured onto each printer of printing devices 304.

In the embodiment, agent 310 uses a mechanism for reporting back, e.g. phoning home, about activities on that particular printing device. Agent 310 collects logs and alerts, among other data. Subsequently, such collected information goes to a web service 312 that is always listening. In an embodiment, a periodicity of reporting, logging, or alerting the information is provided. It should be appreciated that information between agent 310 and web service 312, or more generally, data center 308 is bi-directional. For example, not only does agent 310 report information up to the cloud or to data center 308, but in addition the cloud or data center 308 may query agent 310 for information.

Data center 308 contains, but is not limited to, different services. As well, data center 308 may be on an intranet, an internet, inside of a firewall, or outside of a firewall. In addition, data center 308 is based on a web-based architecture, in which web pages 316 are served or delivered. For instance, as information is collected, analytics are performed around such collected data. Further, data center 308 is configured to build web pages on the fly to present such data in real-time.

Data center 308 is configured for providing web applications 314 in the form of, but not limited to, dashboards, reports, and analytics. It should be appreciated that web applications 314 may provide a number of applications or various ways of analyzing the data. In addition, data center 308 is configured to provide database information in databases 318. For example, web applications 314 may be configured to provide different programs that recognize the different information received, comparing such information with how it is configured to determine what is needed specifically, and generating the appropriate web pages 316 for customer 302. Such web pages 316 may provide analytics, using different algorithms and formulas, and provide graphics representation of the data, including, but not limited to, trends, benchmark comparisons, and probabilities of various risks.

Further, customer site 306 may be configured for requesting one dashboard or another dashboard. It should be appreciated that data center 308 is configured for providing standard functionality, such as but not limited to network operations, other web servers, license management, and the like 324.

Further, data center 308 is configured for providing shared databases 320, which are not limited to data of customer 306. In an embodiment, data at shared databases 320 is used in aggregate, e.g. to compare patterns. In an embodiment, shared databases 320 is configured such that data from databases 318 may be compared with data from another data center, another customer site, or multiple subgroups of the printers of customer 306 (not shown.) In addition, the embodiment allows overlapping data and comparing and contrasting data. For example, for customer 302, the following questions may be asked and answered, in accordance with embodiments herein. How is my business doing? How is my print shop doing? How is my print workflow doing when compared to another business? How is my print workflow doing for one set of printers operating as opposed to a different set of workflows within either my environment or an external environment?

In one embodiment, data from external environments are presented anonymously. For instance, customer 302 cannot know about data of another entity, e.g., but not limited to, cannot know about the source of such data or cannot know information about another customer.

Return on Investment (ROI)

An embodiment is configured to provide a return on investment (ROI) for end-users. Basically from an end-user perspective, once data is sent via the agents to the data center, the data center aggregates and otherwise analyzes the data and reports ROI-related information back to the customer. For example, end-users may learn how many prints their machines have actually been printing versus what they have been charging customers for to get a waste or overage number that can be used as part of a computation of total cost of ownership. Further, e.g. in the case of an internal in-house facility, one embodiment is configured to aggregate print data from the shops in the internal in-house facility and compute estimates of profit and loss trends. As well, such embodiment may generate and present patterns that can be used to create, or cause to be created, more effective decisions on which resources, such as materials, ink, printers, etc., to use in the future. Thus, the end-users are given an approximate total cost of ownership so that they may make better-informed decisions about investing or operating their business. As another example, the end-users, when using one embodiment, may learn the true cost of media, toner, click charges, lease rates, and so on.

Analytics and Predictions

Figure 4:
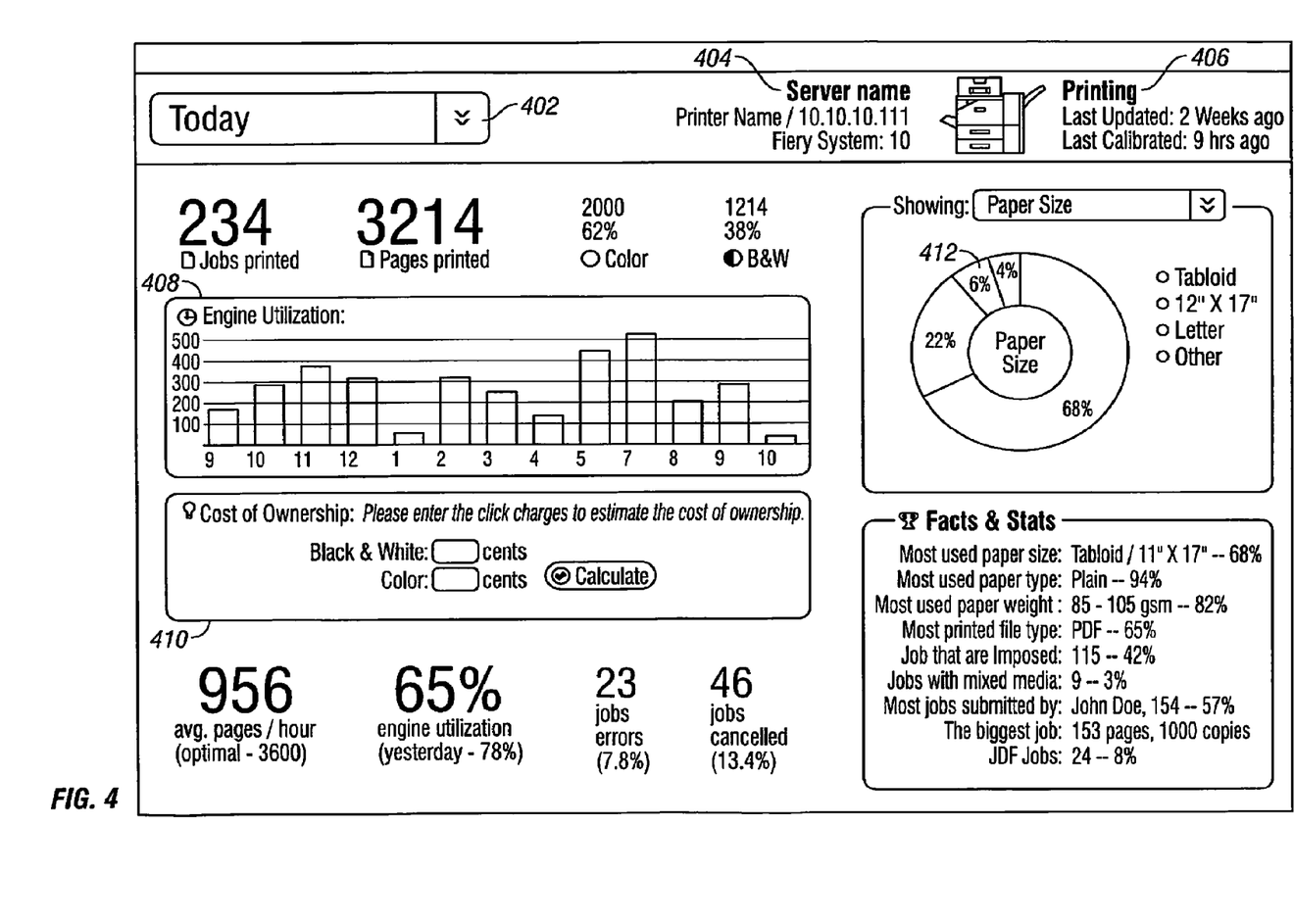
FIG. 4 is a sample screen print of a sample display of particular detailed data of a particular device, according to an embodiment.
Figure 5:
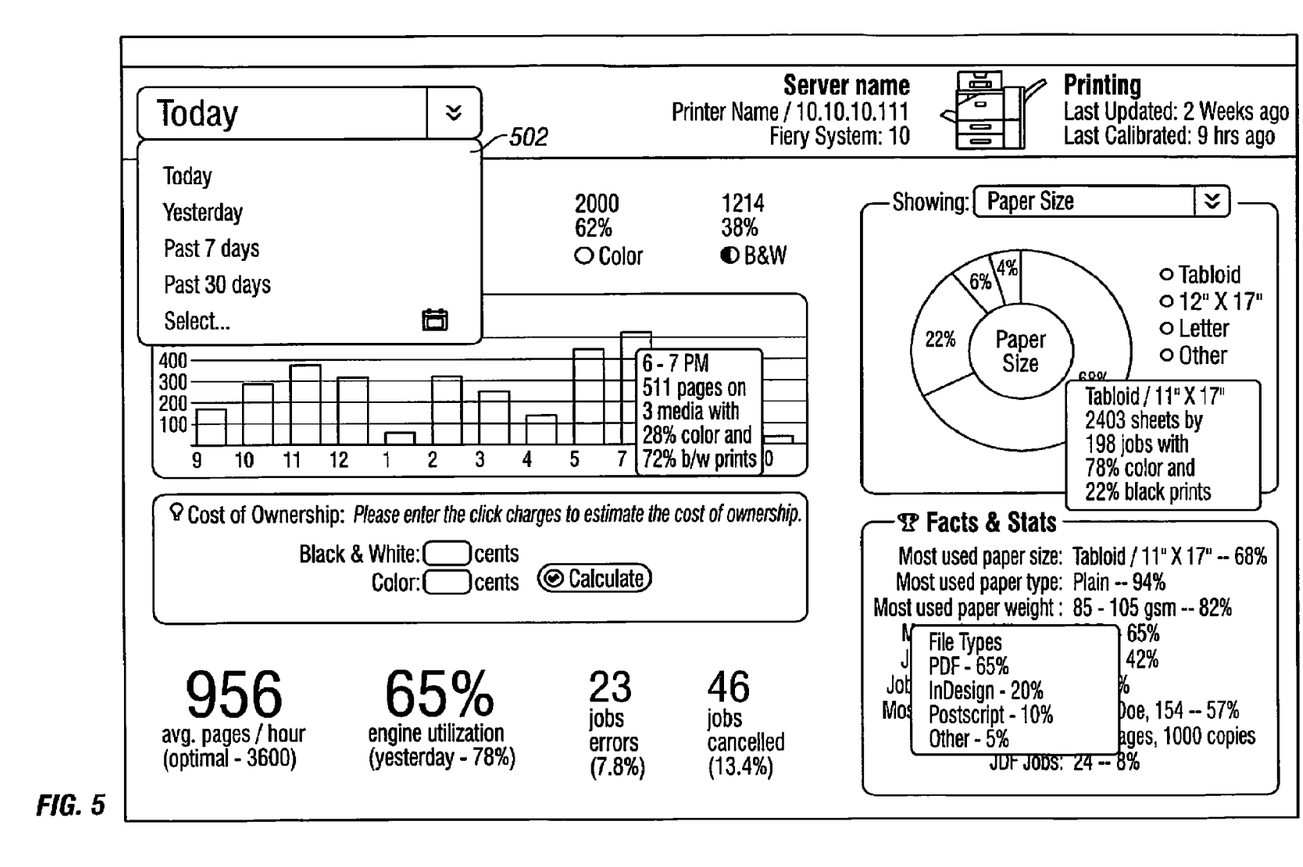
FIG. 5 is a sample screen print of a sample display, showing mouse-over results when the mouse is over particular areas of the sample display of FIG. 4, according to an embodiment.

An embodiment provides performing analytics on customer data, such that the customer may make predictions. An embodiment provides views of such analyzed data and other relevant data. An embodiment can be understood with references to FIG. 4 and FIG. 5. FIG. 4 is a sample screen print of a sample display of data from a single printer according to an embodiment and FIG. 5 shows mouse-over effects on the sample screen print of FIG. 4.

It should be appreciated that such sample screen shots are by way of example only and are not meant to be limiting.

At the top is a selection list box 402 that enables an end-user to choose the time-range of printer data that they want to look at. For example, the end-user may desire to view data based on the last 24 hours, the last week, the previous month, and so on. In the example, the end-user chooses to look at data for "Today." Referring At the top and to the right, the end-user can view the server name 404 of the selected server, which the display data represents.

For this particular printer or server, some statistics 406 are shown, such as when updated, what is the calibration status, and what is the printer status, etc.

Following down there is kind of a global overview of what has happened in the past 24 hours with that printer. Thus, the end-user can see that 234 jobs printed and 3214 pages were printed. That is, an embodiment collects printer data and presents various views of such data.

Other types of data presented may include how many pages printed were color and black and white out of the total number of pages. An engine utilization chart 408 is presented. In this implementation, chart 408 may be altered between a bar versus a line chart and so on. For purposes of discussion herein, engine utilization may reflect a variety of measurements, depending upon the configuration of the embodiment and algorithms applied.

Thus, the end-user may look at the time of the day and sees how many pages were printed and other relevant data. Therefore, such embodiment allows the system or an end-user to predict certain aspects of his printing devices and business. For example, the busiest time of the day can be predicted. Thus, the end-user may make sure they have supplies in place for when their own customers come in. Thus, embodiments herein enable device managers to be able to handle particular jobs in the right way. Thus, embodiments herein provide data analysis and prediction, e.g. projections for a next week and so on. Thus, embodiments herein enable customers to stock, plan out in detail, or at least be prepared for what might be the busiest time and how, consequently, they will schedule prints jobs.

The embodiment provides a cost of ownership. Thus, the sample screen shot provides a cost of ownership widget 410. For example, because it may be unique for customers in how they get charged, the embodiment takes some informational data from such customer and provides them this particular benefit: data reflecting cost of ownership.

It should be appreciated that such customers, e.g. print shop owners, are being charged in multiple ways for the user of their printers. For example, leasing the printers is a cost. Particulars related to such cost may be, but are not limited to, toner in and toner out, charges per click, etc. As mentioned, sometimes print shop proprietors buy or lease printers. Thus, embodiments herein are configured to gather such cost-related information, e.g. how much the business is being charged, and then able to determine an estimate of the total cost of ownership. As a specific example taken from FIG. 4 and FIG. 5, an embodiment is configured to determine how much it costs the business to print 234 jobs, where 62 percent is color and 38 percent is black and white jobs.

An embodiment further collects information related to other aspects of running a printing business, such as, but not limited to, technological maintenance, how many hours they're operating (uptime), which is the shift, which are the holidays, and so forth.

An embodiment aggregates the aforementioned data and presents an estimate of total cost of ownership.

An embodiment provides further data analysis and presentation, such as, but not limited to, the average number of pages per minute, per hour, etc. An embodiment can provide the percent utilization, e.g. 65 percent as shown in the example screen shot. Thus, if a shop proprietor is trying to achieve 100 percent utilization and learns that his machine is operating at 65 percent, then he can make a subsequent informed decision.

The information provided by embodiments herein can provide analytics that include errors. Owners presumably want to avoid errors. They lose quite a bit of time when there are errors. Such errors may be human errors, user errors, errors that may cause paper jams, physical issues, and the like. For example, sample screen print shows 23 jobs errors, which is 7.8 percent of the total, as well as cancellations, e.g. 46 jobs cancelled. It has been found that cancelling a job may cause delay on how the shop produces output overall. Thus, embodiments herein are configured to highlight and compile such data and provide details for the benefit of customers.

An embodiment provides information about parts usage. For example, in one embodiment, media usage 412 is provided, as shown in FIG. 4. In the example, media usage by paper size is shown. That is, an embodiment provides a breakdown of particular information. Such breakdown may be the analysis, however also allows predicting, because now the end-user or system knows how much paper is being used. Thus, when paper needs to be ordered going forward, the embodiment enables predicting an estimated future amount. For example, the embodiment may provide an average amount of such media used or the most amount used, e.g. tabloid.

Put another way, embodiments herein provide facts and statistics that may lead to predictions, for the benefit of customers. Customers get a good handle on the following type of data and performance within their shop(s): what is the most used paper size, what is the paper type, which color, which sizes, the paper weight used, the thickness, what types of jobs are printing, what file types, and so on. By using such embodiments, customers may determine, but are not limited to, whether they have to hire someone new, change their supply side order strategy, or promote different types of paper stock. Further, customers may look at, but are not limited to, the types of print jobs and subsequently, but not limited to, focus on the most common job types, the most common workflows, finishing, binding, or the most used scenario and cater the training accordingly. Embodiments provide a tool by which customers can be as productive as possible.

Figure 6:
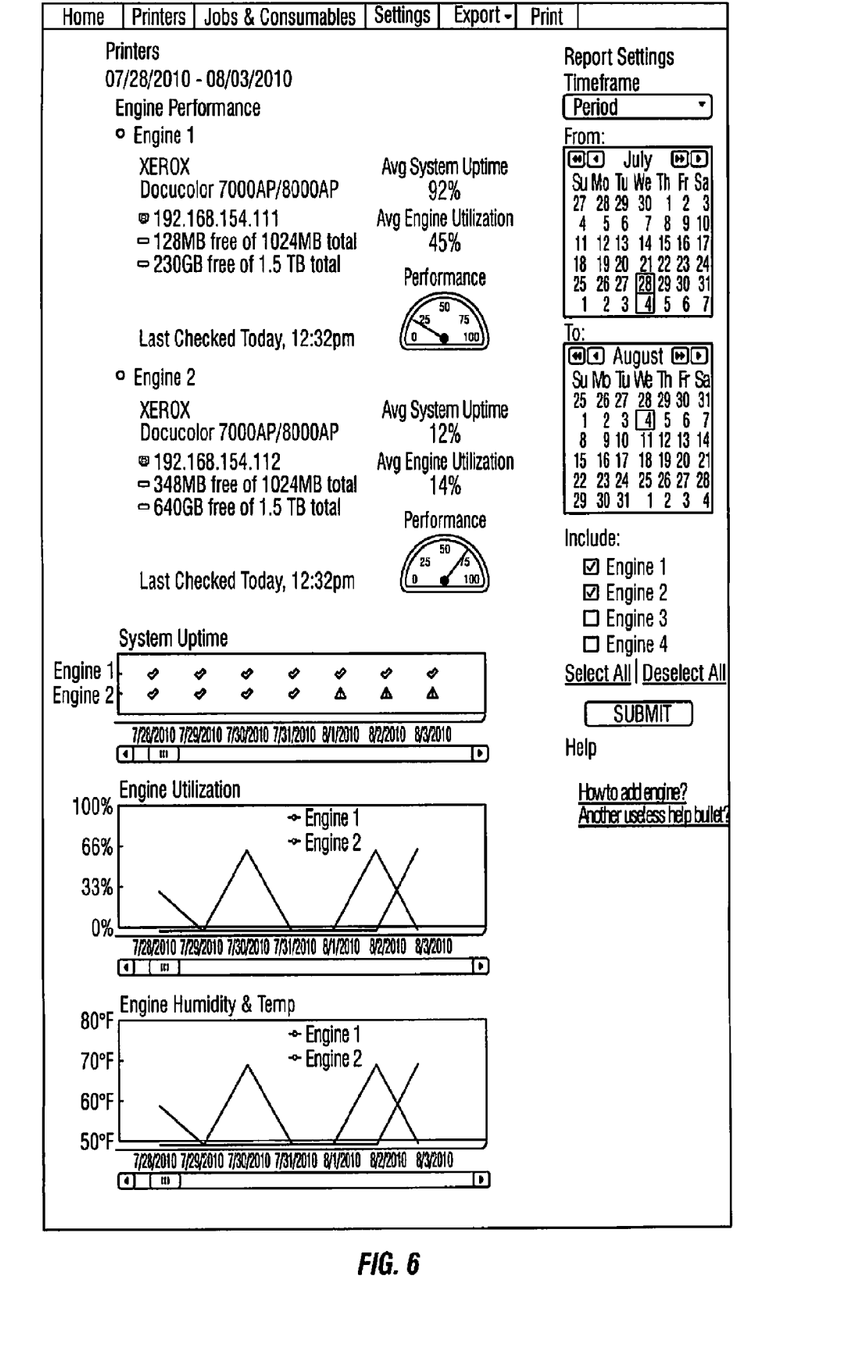
FIG. 6 is a sample screen print of a sample display presenting particular data and computed statistics of an example Engine 1 and an example Engine 2, according to an embodiment.

An embodiment can be understood with reference to FIG. 6, a sample screen print of a sample display presenting particular data and computed statistics of an example Engine 1 and an example Engine 2, according to an embodiment. Such sample display shows not just one printer but multiple printers. In the embodiment, multiple printers may be selected for obtaining analytics. For example, to the right of such display, it shows dates or date ranges that are selected as well as how many printers for which it is desired to aggregate the data.

In an embodiment, the end-user is provided an opportunity when he or she first signs up or registers, e.g. registers a printer, to obtain many differences and contrasts with respect to the devices for which he or she may select and aggregate data. In this example, two of the printers have been selected. Thus, the system compiles data for which the end-user is interested in and performs analytics on such data. The embodiment is configures to display many types of aggregated data. In the example shown, uptime and engine performance is shown at the top of the figure. Some details about average uptime and the engine utilization are also shown.

For purposes of discussion herein, system uptime reflects whether the printer is printing. An embodiment is configured to help determine when and why the printer is not printing. For instance, the cause of the printer being idle may be determined. A printer may be idle due to, but not limited to, an error, e.g. a paper jam, or lack of incoming work into the printer's queue. One embodiment is configured to identify patterns. For example, the embodiment is configured to determine whether particular paper jams occur most commonly in conjunction with a specific media type, paper size, weight, or file type. As well, an embodiment is configured to correlations. For instance, an embodiment is configured to determine whether there is a correlation of a paper jam with time of day or with file type. Embodiments are configured to perform analysis and computations such that questions about particular correlations can be answered for the end-user. For example, an end-user may determine whether a problem with the device is specific to the device's location, such that weather or another environmental factor may play a contributing role.

In one embodiment, hardware is configured to detect attributes of the environment. For example, hardware is configured to sense temperature and humidity at the customer site, e.g. the print shop. Why it matters is the color of the actual quality of the printouts and the paper, how the finished job comes out, may depend on the condition and the humidity and temperature patterns present in the print shop. It is contemplated that embodiments herein determine and present performance, including, but not limited to, the quality that may be impacted depending on the humidity, temperature, and other measurable physical attributes.

Device Configuration Management

Figure 7:
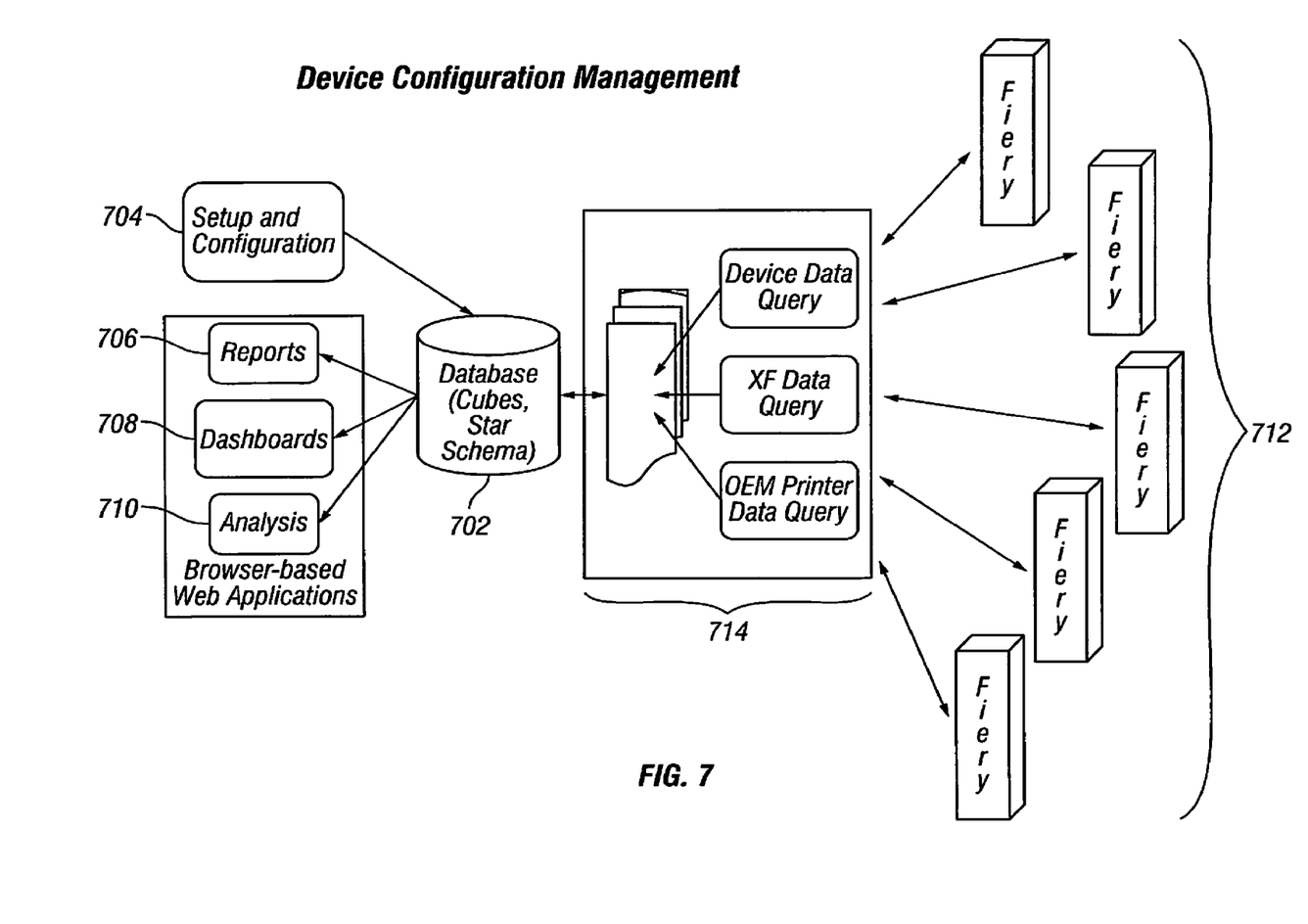
FIG. 7 is a schematic diagram of device configuration management showing the relationships between components, according to an embodiment.

An embodiment of device configuration management can be understood with reference to FIG. 7, a schematic diagram of device configuration management showing the relationships between components. The configuration includes, but is not limited to, a database 702 that stores data and receives input from devices 712. In the example implementation shown in FIG. 7, devices 712 are printers.

Further, the configuration includes, but is not limited to, configured applications to manipulate the data in database 702. For example, the configured applications may be browser-based web applications, as shown in the figure. In the embodiment, one application of the configured applications is setup and configuration 704. Setup and configuration 704 is configured to set up and configure database system 702. Some operations performed by setup and configuration 704 include, but are not limited to, identify or register the particular printers, e.g. printers 712, from which data is desired or used to compare therewith. It should be appreciated that other set up and configuration parameters may be set.

Further, an agent (not shown) is downloaded onto or already present and enabled or configured on each printer of printers 712 for the purposes of, including but not limited to, communicating with database 702 in a bidirectional scheme. Such agents allow data to be pushed from printers 712 to database 702 as well as be pulled from printers 712 by database 702.

In an embodiment, database 702 receives predetermined data from printers 712. In the embodiment, printers 712 may be prearranged or preconfigured for sending data to database 702 on a particular time frame or for being queried by database 702 on a particular time frame.

The embodiment provides, but is not limited to, mechanisms for presenting the received data. For example, as shown in FIG. 7, the configuration includes a reports application 706 for representing data in one or more reports. The configuration further includes a dashboard application 708 for representing data in a dashboard platform. The configuration further includes an analysis application 710 for performing analytical operations of the data.

Further, an embodiment is configured to allow data that is received by database 702 to be compared with, including but not limited to, data within one particular set of printing devices of printers 712 and data across other shops and across other locations. It should further be appreciated that such data may include a limitless type of information including, but not limited to, environmental and other relevant and applicable informational data. Examples of data that may be compared include, but are not limited to, error rates or failure rates in one environment to another environment or throughput rates, downtime, and utilization, so on.

It should be appreciated that such information allows enterprises to offer new types of products that they have not had access to before.

An Example Machine Overview

Figure 8:
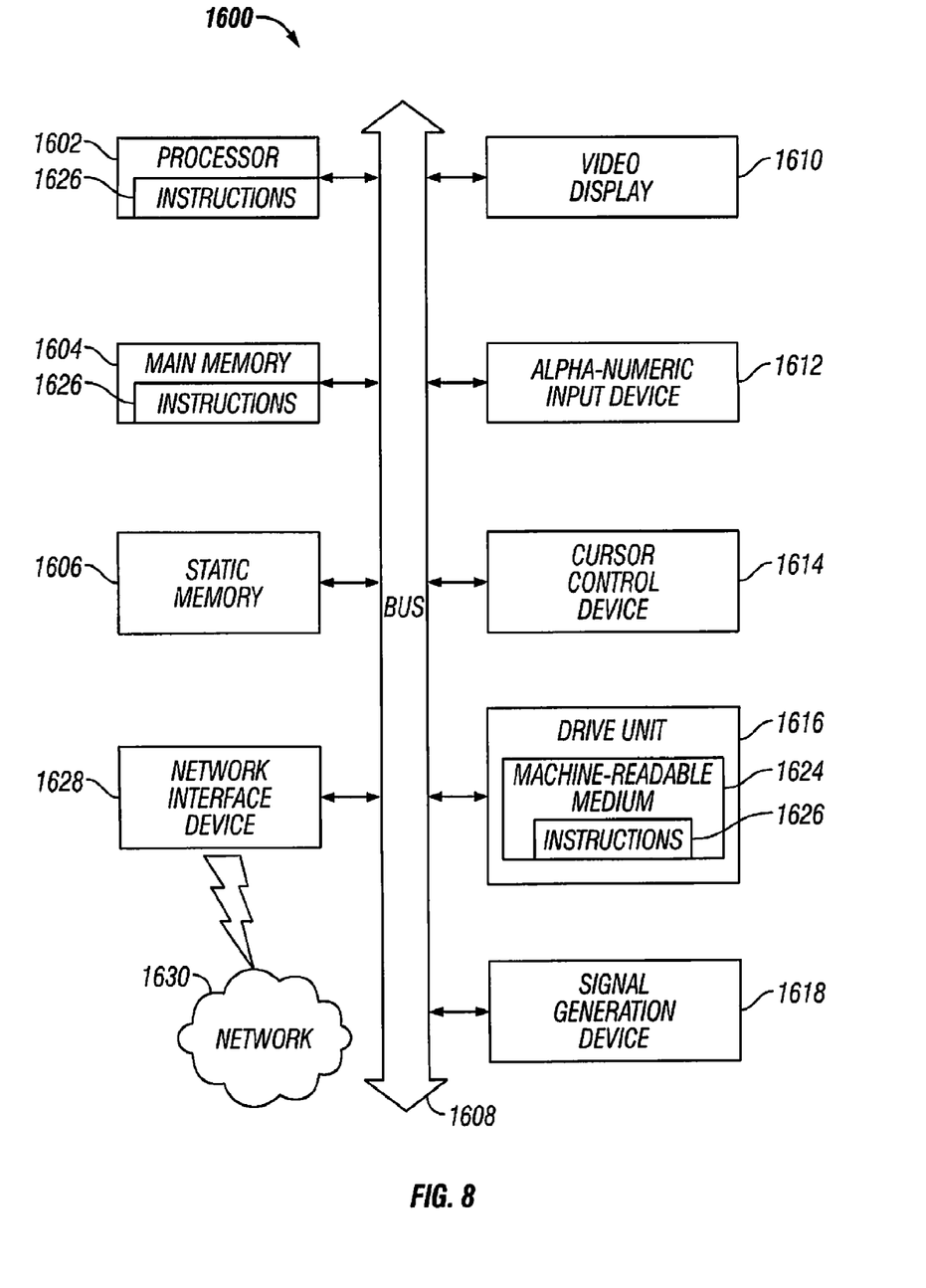
FIG. 8 is a block schematic diagram of a system in the exemplary form of a computer system according to an embodiment.

FIG. 8 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for an automated device dashboard, comprising:
    a data center comprising one or more applications and one or more databases, wherein said one or more applications are configured for generating and presenting automated dashboards, reports, or analytics, using, in part, data stored in said one or more databases; and
    a plurality of agents, wherein each agent is in communication with said data center and is in communication with a particular device of a plurality of devices, wherein each agent comprises informational data about said particular device, and wherein each agent is configured for pushing said informational data or part thereof to said data center and configured for said informational data or part thereof being pulled therefrom.

2. The apparatus of claim 1, wherein said automated dashboards, reports, or analytics present data, said presented data comprising any of: trends, benchmark comparisons, and probabilities of various risks.

3. The apparatus of claim 1, wherein said data center is based on a web-based architecture, in which web pages comprise data or part thereof from said one or more databases and are delivered in real-time, and wherein said each agent is a web-service agent.

4. The apparatus of claim 1, wherein said at least one database of said one or more databases is configured for sharing data among a plurality of end-users, wherein said sharing data comprises comparing or contrasting data from another data center, another customer site, or multiple sub-groups of said devices.

5. The apparatus of claim 4, wherein said shared data from said plurality of end-users is shared anonymously, wherein one end-user of said plurality of end-users does not know the source of data provided by another end-user of said plurality of end-users.

6. The apparatus of claim 1, wherein said plurality of devices are printing devices.

7. The apparatus of claim 6, wherein at least one printing device of said printing devices is configured for detecting attributes of the physical environment of the at least one printing device.

8. The apparatus of claim 7, wherein said attributes comprise temperature and humidity.

9. The apparatus of claim 1, wherein said automated dashboards, reports, or analytics comprise any of: information about utilization of one or more devices of said plurality of devices, cost of ownership of one or more devices of said plurality of devices, and facts and statistics about one or more devices of said plurality of devices.

10. The apparatus of claim 1, wherein said information reflects a particularly selected time period.

11. A computer-implemented method for an automated device dashboard, comprising the steps of:
providing a data center comprising one or more applications and one or more databases, wherein said one or more applications are configured for generating and presenting automated dashboards, reports, or analytics, using, in part, data stored in said one or more databases; and
providing a plurality of agents, wherein each agent is in communication with said data center and is in communication with a particular device of a plurality of devices, wherein each agent comprises informational data about said particular device, and wherein each agent is configured for pushing said informational data or part thereof to said data center and configured for said informational data or part thereof being pulled therefrom;
wherein at least one of the steps is performed by a processor.

12. The method of claim 11, wherein said automated and configurable dashboards, reports, or analytics present data, said presented data comprising any of: trends, benchmark comparisons, and probabilities of various risks.

13. The method of claim 11, wherein said data center is based on a web-based architecture, in which web pages comprise data or part thereof from said one or more databases and are delivered in real-time, and wherein said each agent is a web-service agent.

14. The method of claim 11, wherein said at least one database of said one or more databases is configured for sharing data among a plurality of end-users, wherein said sharing data comprises comparing or contrasting data from another data center, another customer site, multiple subgroups of said devices or aggregated data centers or subgroups.

15. The method of claim 14, wherein said shared data from said plurality of end-users is shared anonymously, wherein one end-user of said plurality of end-users does not know the source of data provided by another end-user of said plurality of end-users.

16. The method of claim 11, wherein said plurality of devices are printing devices or printing related devices.

17. The method of claim 16, wherein at least one printing device of said printing devices is configured for detecting attributes of the physical environment of the at least one printing device.

18. The method of claim 17, wherein said attributes comprise temperature and humidity.

19. The method of claim 11, wherein said automated dashboards, reports, or analytics comprise any of: information about utilization of one or more devices of said plurality of devices, cost of ownership of one or more devices of said plurality of devices, and facts and statistics about one or more devices of said plurality of devices.

20. The method of claim 11, wherein said information reflects a particularly selected time period.

21. An apparatus for an automated device dashboard, comprising:
a data center comprising one or more applications and one or more databases, wherein said one or more applications are configured for generating and presenting automated dashboards, reports, or analytics, using, in part, data stored in said one or more databases; and
a plurality of devices, each device configured to be in direct communication with said data center, wherein said each device communicates informational data about itself by pushing said informational data or part thereof to said data center or by being configured for said informational data or part thereof being pulled therefrom by said data center;
wherein said data stored in said one or more databases reflects said pushed or pulled informational data, or parts thereof.

* * * * *